(12) United States Patent
Hatanaka et al.

(10) Patent No.: US 9,094,228 B2
(45) Date of Patent: Jul. 28, 2015

(54) HOME APPLIANCE MONITORING SYSTEM

(75) Inventors: Tomoyuki Hatanaka, Yamato Takada (JP); Osamu Sekine, Toyonaka (JP); Shuji Murakami, Takaishi (JP); Hiroyasu Nakanishi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 108 days.

(21) Appl. No.: 13/320,147

(22) PCT Filed: May 11, 2010

(86) PCT No.: PCT/JP2010/057930
§ 371 (c)(1),
(2), (4) Date: Dec. 1, 2011

(87) PCT Pub. No.: WO2010/131635
PCT Pub. Date: Nov. 18, 2010

(65) Prior Publication Data
US 2012/0066384 A1 Mar. 15, 2012

(30) Foreign Application Priority Data

May 11, 2009 (JP) .................. 2009-114901

(51) Int. Cl.
*G06F 15/173* (2006.01)
*H04L 12/28* (2006.01)

(52) U.S. Cl.
CPC .................. *H04L 12/2823* (2013.01)

(58) Field of Classification Search
CPC .......... H04L 29/06; H04L 41/22; H04L 43/00
USPC ....................................................... 709/224
See application file for complete search history.

(56) References Cited

U.S. PATENT DOCUMENTS

| 2002/0128728 A1 | 9/2002 | Murakami et al. | |
|---|---|---|---|
| 2006/0173997 A1* | 8/2006 | Tullberg et al. | 709/224 |

(Continued)

FOREIGN PATENT DOCUMENTS

| JP | 5-14971 A | 1/1993 |
|---|---|---|
| JP | 2004-280717 A | 10/2004 |
| JP | 2004-320260 A | 11/2004 |
| WO | WO-2007/140326 A2 | 12/2007 |

OTHER PUBLICATIONS

International Search Report for the Application No. PCT/JP2010/057930 mailed Jun. 15, 2010.

(Continued)

*Primary Examiner* — Vivek Srivastava
*Assistant Examiner* — Sibte Bukhari
(74) *Attorney, Agent, or Firm* — Renner, Otto, Boisselle & Sklar, LLP.

(57) ABSTRACT

A home appliance monitoring system includes: a plurality of home systems respectively including a central managing device configured to collect monitoring information from a home appliance; and a center server connected to the central managing device of each home system. The center server calculates the current load amount, and sends an activating instruction signal or a deactivating instruction signal to each central managing device on the basis of the current load amount. The central managing device sets its communication status to an activated status in response to receiving the activating instruction signal, and sets its communication status to a deactivated status in response to receiving the deactivating instruction signal. The home system stores the monitoring information while the communication status is the deactivated status. The home system sends the stored monitoring information to the center server when the communication status is switched from the deactivated status to the activated status. The home system sends the monitoring information to the center server while the communication status is the activated status. The center server stores the monitoring information received from the home system.

9 Claims, 12 Drawing Sheets

(56) References Cited

U.S. PATENT DOCUMENTS

2010/0109883 A1* 5/2010 Santos ............................ 340/584
2010/0153544 A1* 6/2010 Krassner et al. ............... 709/224
2010/0217837 A1* 8/2010 Ansari et al. .................. 709/218

OTHER PUBLICATIONS

Supplementary European Search Report for corresponding European Application No. 10774892.3 dated May 15, 2014.

* cited by examiner

HOME APPLIANCE MONITORING SYSTEM

TECHNICAL FIELD

The present invention relates to a home appliance monitoring system.

BACKGROUND ART

In the past, there have been various remote device monitoring systems (home appliance monitoring systems) (cf. JP 2004-320260 A).

Particularly, in the home appliance monitoring system used for remote monitoring, each central managing device collects monitoring information (detection result) from home appliances such as a thermo-hygrometer, a wattmeter, a sensor measuring lighting period of a lighting fixture, and a human sensor. In addition, a center server obtains the monitoring information of the home appliance under each central managing device, and stores the obtained information.

With respect to the aforementioned home appliance monitoring system where the center server obtains the monitoring information from each central managing device, loads on the center server will increase as a system size is increased with an increase of the number of the central managing devices. To reduce the loads on the center server requires an increase of the number of the center servers and improvement of the performance of the center server, for example. However, there is a problem that such a method against the expansion of the system scale needs high cost.

DISCLOSURE OF INVENTION

In view of the above insufficiency, the present invention has been aimed to propose a home appliance monitoring system capable of increasing the number of central managing devices with low cost.

The home appliance monitoring system in accordance with the present invention includes a plurality of home systems and a center server. The home systems are adapted to be installed in residences, respectively. Each home system includes a central managing device configured to collect monitoring information from a home appliance. The center server is adapted to be installed in premises different from the residences and is connected to the central managing device of each home system via a transmission path. The center server includes a load determination unit, a status setting unit, and a monitoring information storage unit. The load determination unit is configured to calculate a load amount of the center server. The status setting unit is configured to perform a status setting processing of selecting one from an activated status and a deactivated status, as a communication status of each central managing device, on the basis of the load amount calculated by the load determination unit. The status setting unit is configured to refer to a result of the status setting processing, and send, to each central managing device, one selected from an activating instruction signal indicative of setting the communication status to the activated status and a deactivating instruction signal indicative of setting the communication status to the deactivated status. The central managing device is configured to set the communication status to the activated status in response to receiving the activating instruction signal, and to set the communication status to the deactivated status in response to receiving the deactivating instruction signal. The home system is configured to store the monitoring information while the communication status is set to the deactivated status. The home system is configured to send the stored monitoring information to the center server via the transmission path when the communication status is switched from the deactivated status to the activated status. The home system is configured to collect the monitoring information from the home appliance and send the same to the center server via the transmission path while the communication status is set to the activated status. The monitoring information storage unit is configured to store the monitoring information received from the home system.

In a preferred embodiment, the central managing device includes an information collection unit configured to receive the monitoring information from the home appliance, a monitoring information buffer, and a communication control unit. The communication control unit is configured to set the communication status to the activated status in response to receiving the activating instruction signal, and set the communication status to the deactivated status in response to receiving the deactivating instruction signal. The communication control unit is configured to store the monitoring information received by the information collection unit in the monitoring information buffer while the communication status is set to the deactivated status. The communication control unit is configured to send the monitoring information stored in the monitoring information buffer to the center server via the transmission path when the communication status is switched from the deactivated status to the activated status. The communication control unit is configured to send the monitoring information received by the information collection unit to the center server via the transmission path while the communication status is set to the activated status.

In this preferred embodiment, preferably, the communication control unit is configured to monitor data volume of the monitoring information stored in the monitoring information buffer. The communication control unit is configured to, upon acknowledging that the data volume reaches predetermined volume, switch the communication status to the activated status.

In another preferred embodiment, the home system includes the home appliance. The central managing device is configured to, upon receiving the activating instruction signal, announce to the home appliance that the communication status is the activated status, and to, upon receiving the deactivating instruction signal, announce to the home appliance that the communication status is the deactivated status. The home appliance is configured to store the monitoring information while the communication status is set to the deactivated status. The home appliance is configured to send, to the central managing device, the monitoring information which the home appliance stores while the communication status is the deactivated status, when the communication status is switched from the deactivated status to the activated status. The home appliance is configured to send the monitoring information to the central managing device while the communication status is the activated status. The central managing device is configured to send, to the center server, the monitoring status received from the home appliance while the communication status is set to the activated status.

In a preferred embodiment, the center server further includes a random number generation unit configured to generate a random number. The status setting unit is configured to determine, for each central managing device, probability information indicative of a probability that the communication status is set to the activated status, on the basis of the load amount calculated by the load determination unit. The status setting unit is configured to determine, on the basis of comparison between the probability indicated by the probability information and the random number generated by the random number generation unit, whether or not the communication status is set to the activated status.

In this preferred embodiment, the status setting unit is configured to measure a period within which no monitoring information is obtained from the central managing device, and increase the probability with an increase of the period.

In this preferred embodiment, the home system further includes a plurality of the home appliances having the monitoring information of different classes. The status setting unit is configured to allocate a priority rank to the class of the monitoring information. The status setting unit is configured to calculate a distribution of the priority rank of the monitoring information for each central managing device, on the basis of the monitoring information received from the central managing device. The status setting unit is configured to increase the probability to a greater extent to the central managing device which exhibits the distribution in which the priority ranks are offset closer to a high side.

In another preferred embodiment, the status setting unit is configured to determine the number of the central managing devices per one group on the basis of the load amount calculated by the load determination unit, and classify all of the central managing devices into plural groups. The status setting unit is configured to select one from the plural groups as an activation group in which the communication status of the central managing device is set to the activated status, and select a rest of the plural groups as a deactivation group in which the communication status of the central managing device is set to the deactivated status. The status setting unit is configured to switch the group selected as the activation group at a predetermined timing.

In this preferred embodiment, the status setting unit is configured to allocate identification numbers to the central managing devices, respectively in order, the identification numbers being defined as integers incremented from a predetermined integer. The status setting unit is configured to classify, on the basis of a remainder of dividing the identification number of the central managing device by a divisor which is not less than "2", all of the central managing devices into the plural groups in the number equal to the divisor.

In a preferred embodiment, the status setting unit is configured to measure a period within the communication status of the central managing device is kept the deactivated status. The status setting unit is configured to, upon acknowledging that the period exceeds a predetermined threshold, determine to set the communication status of the central managing device to the activated status.

In another preferred embodiment, the status setting unit is configured to store, for each central managing device, a history indicative of a time of reception of the monitoring information from the central managing device. The status setting unit is configured to generate, on the basis of the history, a time pattern indicative of transmission time defined as time at which the central managing device sends the monitoring information to the center server and non-transmission time defined as at which the central managing device sends no monitoring information to the center server. The status setting unit is configured to calculate a degree of similarity between the time patterns of the central managing devices. The status setting unit is configured to determine, on the basis of a comparison of the degree of the similarity and a predetermined threshold, whether or not the time patterns are similar to each other. The status setting unit is configured to classify the central managing devices having the time patterns similar to each other into the same group, and classify the central managing devices having the time patterns dissimilar to each other into different groups. The status setting unit is configured to, with regard to the central managing devices belonging to the same group, send the activation indication signal such that the communication status of the central managing device is kept in the activated status for the transmission time of the time pattern corresponding to the group, and send the deactivation indication signal such that the communication status of the central managing device is kept in the deactivated status for the non-transmission time of the time pattern corresponding to the group.

BEST MODE FOR CARRYING OUT THE INVENTION

First Embodiment

Figure 1:
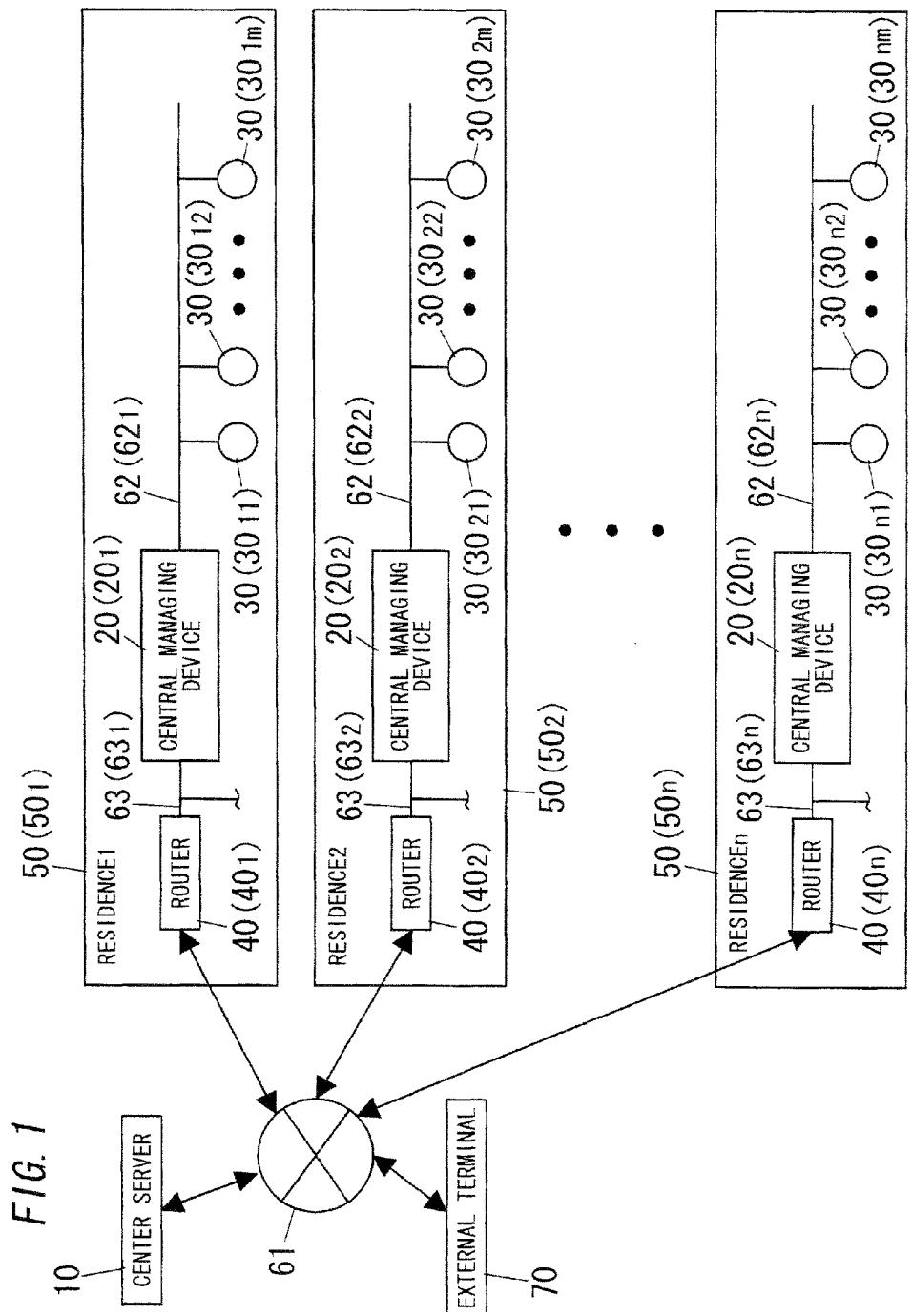
FIG. 1 is a block diagram illustrating the configuration of the home appliance monitoring system of the first embodiment.

FIG. 1 shows a configuration of a home appliance monitoring system of the present embodiment. The home appliance monitoring system includes a plurality of home systems 50 and a center server 10. Each of the home systems 50 includes a central managing device 20 configured to collect monitoring information from one or more home appliances 30. The center server 10 is connected to the central managing device 20 of each home system 50 via the Internet (transmission path) 61.

For example, the home system 50 is adapted to be installed in a residence such as a single unit housing and a multiple unit housing. Each home system 50 includes a single central managing device 20. With regard to each home system 50, the central managing device 20 is connected to one or more home appliances 30 installed in the same residence by use of a communication line 62. Further, each home system 50 includes a terminal device (not shown) installed in a residence. The terminal device is connected to the central managing device 20 via a home network 63. For example, the above terminal device is a display device which is used for displaying the following monitoring information.

In addition, the home system 50 includes a router 40. The router 40 is installed in the residence, and is configured to make connection between the Internet 61 to which the center server 10 is connected and the home network 63 to which the central managing device 20 is connected. Therefore, the center server 10 is connected to the central managing device 20 via the router 40 and the home network 63, and is allowed to communicate with the central managing device 20.

In the following explanation, in order to distinguish between plural same components (the central managing devices 20, the home appliances 30, the routers 40, the home systems 50, the communication lines 62, and the home networks 63), a suffix "n" (n=1, 2, 3, . . . ) is attached to the reference numerals thereof. In particular, the reference numerals of the home appliances 30 are expressed with suffixes "n" and "m" (n=1, 2, 3, . . . , m=1, 2, 3, . . . ).

In the present embodiment, a unique ID information (e.g., a MAC address) used for identifying the home appliance 30 is assigned to the home appliance 30. The central managing device 20 monitors and controls its own home appliance 30 (home appliance 30 connected to the central managing device 20 via the communication line 62) by use of the ID information.

Figure 3:
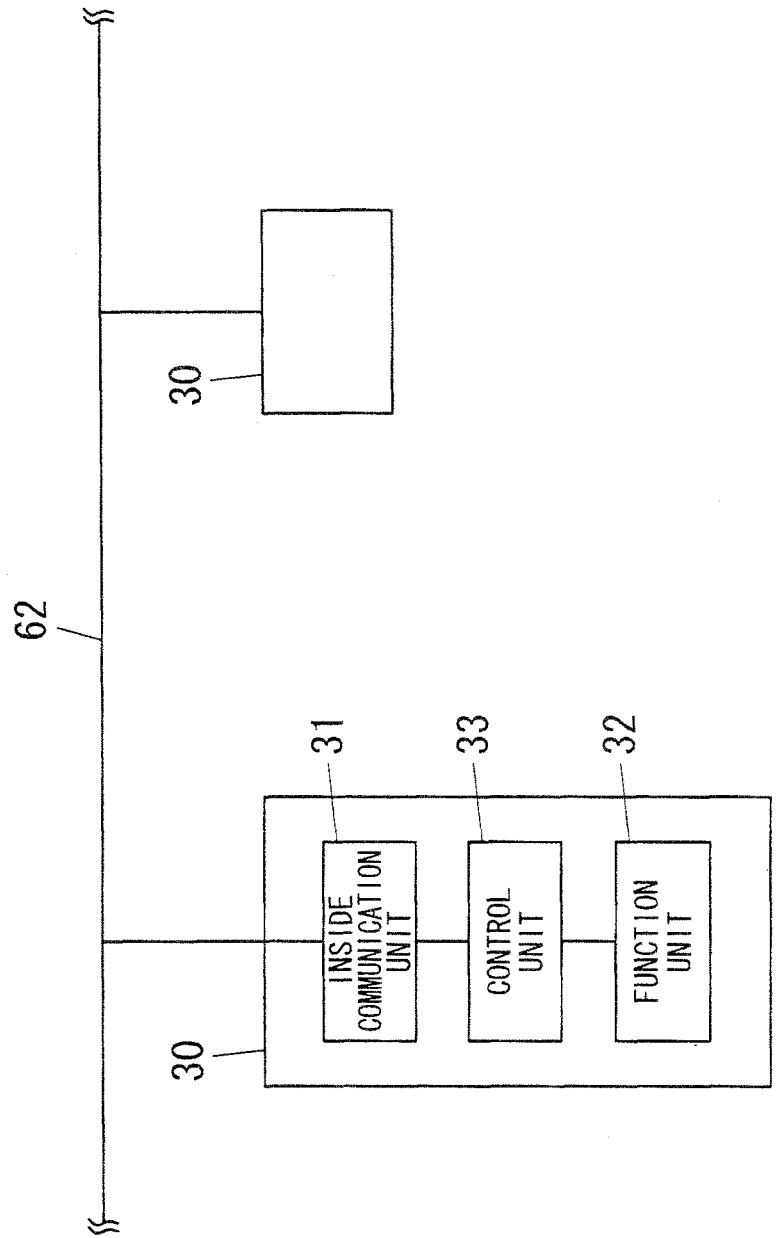
FIG. 3 is a block diagram illustrating the configuration of the home appliance of the above home appliance monitoring system.
Figure 4:
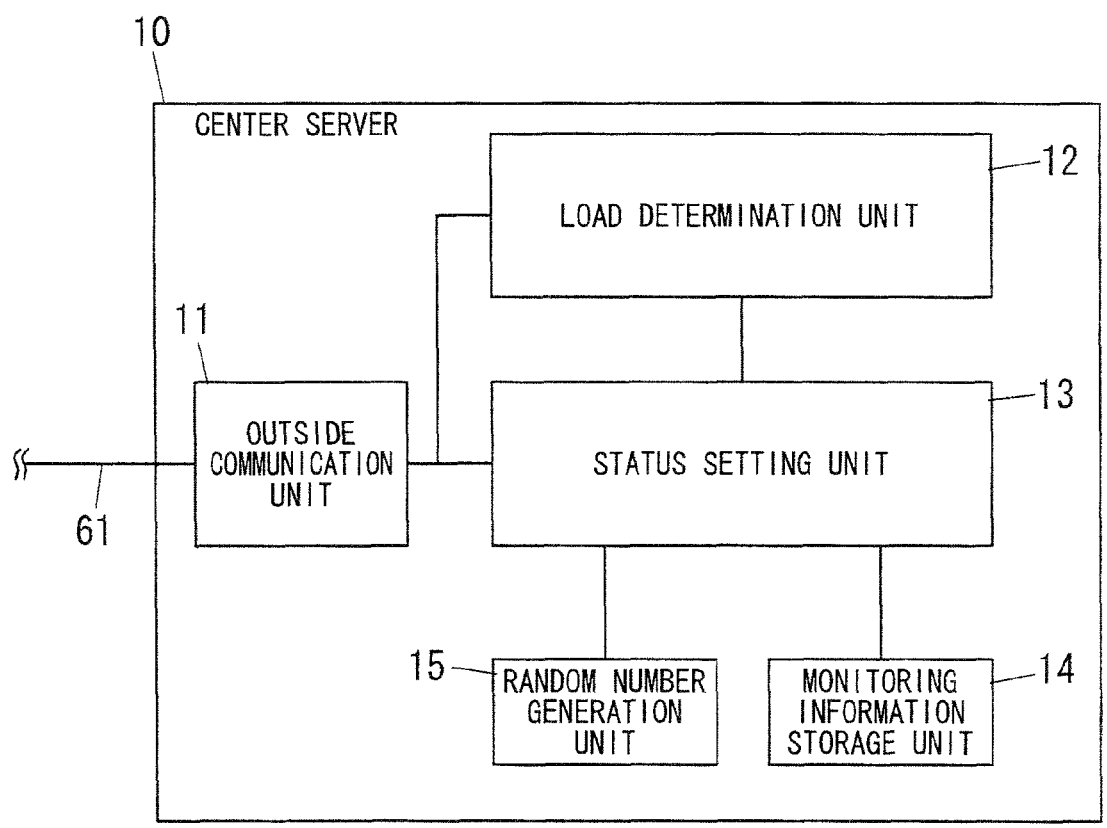
FIG. 4 is a block diagram illustrating the configuration of the center server of the above home appliance monitoring system.

The home appliance 30 is a thermo-hygrometer, a wattmeter, a sensor measuring lighting period of a lighting fixture (lighting period measuring sensor), and a human sensor, for example. The home appliance 30 includes, as shown in FIG. 3, an inside communication unit (second inside communication unit) 31, a function unit 32, and a control unit 33.

The inside communication unit 31 is configured to communicate with the central managing device 20 via the communication line 62.

The function unit 32 is configured to create the monitoring information. For example, when the home appliance 30 is a thermo-hygrometer, the monitoring information is temperature and humidity data indicative of the temperature and the humidity. When the home appliance 30 is a wattmeter, the monitoring information is power data indicative of electrical power (e.g., power consumption). When the home appliance 30 is a lighting period measuring sensor, the monitoring information is lighting period data indicative of a lighting period. When the home appliance 30 is a human sensor, the monitoring information is intruder information indicative of the presence or absence of an intruder. The function unit 32 creates the monitoring information in response to occurrence of a particular event (e.g., a lapse of a predetermined time, and detection of a human).

The control unit 33 is configured to, upon acknowledging that the function unit 32 creates the monitoring information, control the inside communication unit 31 in such a manner to send the monitoring information created by the function unit 32 to the central managing device 20.

Besides, the home appliance 30 may be lighting equipment and air conditioning equipment, for example. When the home appliance 30 is lighting equipment, the home appliance 30 may be turned on and off by the central managing device 20. When the home appliance 30 is air conditioning equipment, the home appliance 30 may be turned on and off by the central managing device 20.

The central managing device 20 has a packet processing function, a path switching function, a network security function, and a function of a UPnP (Universal Plug and Play) control point, for example. The central managing device 20 may be realized by use of a home server configured to control transmission of data in a network.

Figure 2:
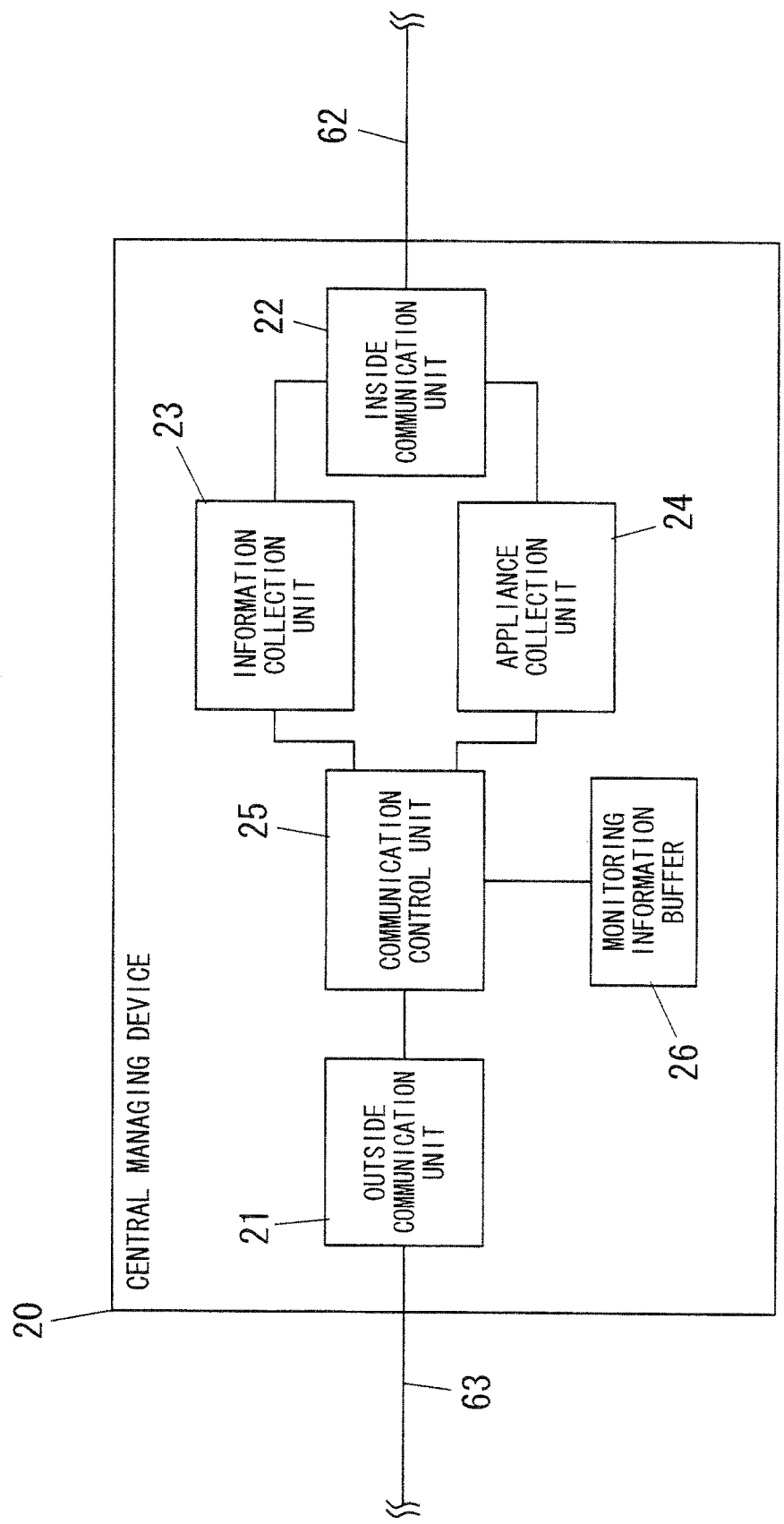
FIG. 2 is a block diagram illustrating the configuration of the central managing device of the above home appliance monitoring system.

As shown in FIG. 2, the central managing device 20 includes an outside communication unit (first outside communication unit) 21, an inside communication unit (first inside communication unit) 22, an information collection unit 23, an appliance control unit 24, a communication control unit 25, and a monitoring information buffer (monitoring information storage unit) 26.

The outside communication unit 21 is configured to communicate with the center server 10 via the home network 63 and the Internet 61.

The inside communication unit 22 is configured to communicate with the home appliance 30 via the communication line 62.

The information collection unit 23 is configured to collect the monitoring information from the corresponding home appliance 30 (home appliance 30 connected to the inside communication unit 22 by use of the communication line 62). The information collection unit 23 may be configured to collect the monitoring information from the home appliance 30 by use of the polling method. Alternatively, the information collection unit 23 may be configured to only receive the monitoring information sent from the home appliance 30 to the central managing device 20. In brief, it is sufficient that the information collection unit 23 is configured to receive the monitoring information from the home appliance 30.

The appliance control unit 24 is configured to control the corresponding home appliance 30.

The communication control unit 25 is configured to control input and output of information among the outside communication unit 21, the inside communication unit 22, the information collection unit 23, the appliance control unit 25, and the monitoring information buffer 26.

The monitoring information buffer 26 is used for storing the monitoring information collected from the home appliance 30 while the below-mentioned communication status is a deactivated status.

In the present embodiment, the communication control unit 25 is configured to set the communication status to an activated status in response to reception of the blow-mentioned activating instruction signal, and to set the communication status to the deactivated status in response to reception of the below-mentioned deactivating instruction signal. In other words, the central managing device 20 is configured to set the communication status to the activated status in response to receiving the activating instruction signal, and to set the communication status to the deactivated status in response to receiving the deactivating instruction signal.

The communication control unit 25 is configured to store the monitoring information received by the information collection unit 23 in the monitoring information buffer 26 while the communication status is set to the deactivated status. The communication control unit 25 is configured to send the monitoring information stored in the monitoring information buffer 26 to the center server 10 via the Internet 61 when the communication status is switched from the deactivated status to the activated status. The communication control unit 25 is configured to send the monitoring information received by the information collection unit 23 to the center server 10 via the Internet 61 while the communication status is set to the activated status.

The center server 10 is installed in premises (e.g., a managing center of a service provider) different from the residences in which the homes systems 50 are respectively installed. The center server 10 is realized by use of a common computer device with a network function. As shown in FIG. 3, the center server 10 includes an outside communication unit (second outside communication unit) 11, a load determination unit 12, a status setting unit 23, a monitoring information storage unit 14, and a random number generation unit 15.

The outside communication unit 11 is configured to communicate with the central managing device 20 via the home network 63 and the Internet 61.

The load determination unit 12 is configured to calculate (determine) a current load amount of the center server 10. For example, the load amount is an amount of communication load of networks and an amount of computational load on the center server 10 caused by an arithmetic processing performed by the center server 10 to execute its function. The load amount varies with time.

The status setting unit 13 is configured to perform a status setting processing of selecting one from the activated status and the deactivated status, as the communication status for each central managing device 20, on the basis of the load amount calculated by the load determination unit 12. In addition, the status setting unit 13 is configured to refer to a result of the status setting processing and send, to each central managing device 20, one selected from the activating instruction signal and the deactivating instruction signal. The activation signal is indicative of setting the communication status to the activated status, and the deactivating instruction signal is indicative of setting the communication status to the deactivated status.

The monitoring information storage unit 14 is used for storing the monitoring information obtained from the central managing device 20.

The random number generation unit 15 is configured to generate a random number. Particularly, in the present embodiment, the random number generation unit 15 generates a random number in the range of 0 to 1.

The center server 10 has a function of retrieving the monitoring information from the central managing device of each residence. The center server 10 stores the monitoring information retrieved from the central managing device 20 in the monitoring information storage unit 14. The monitoring information stored in the monitoring information storage unit 14 is used for a secondary service which does not require a strict real-time information processing. For example, the secondary service is a service of reporting the tendency of the power consumption of each home, and a service of proposing a method for saving energy.

Besides, there is an external terminal 70 which is connected to the center server 10 via the Internet 61. For example, the external terminal 70 is a personal computer connectable to the Internet 61, a mobile phone, and a PDA (Personal. Digital Assistance). The external terminal 70 is configured to establish data communication with the center server 10 via the Internet 61. Therefore, use of the external terminal 70 allows a user to monitor and control the home appliance from outside, for example. The center server 10 has a function of relaying a message such as a message for to the central managing device 20 sent from a terminal device such as the external terminal 70 via the Internet 61 and a message for a terminal device which does not belong to the home network 63 sent from the central managing device 20. Further, the center server 10 has a function of integrating information from each residence, and has a web server function for providing information such as a weather report and a traffic report. Besides, the external terminal 70 having functions of the center server 10 and a function of connecting to the Internet is well known, and explanations and drawings regarding detailed configurations thereof are deemed unnecessary.

The following explanation is made to the operation where the center server 10 retrieves the monitoring information from the central managing device 20 of each residence.

The center server 10 performs a processing for setting the communication status of each central managing device 20 to the activated status or the deactivated status. The central managing device 20 in which the communication status is the activated status sends the monitoring information to the center server 10 in response to occurrence of an event of change in the monitoring information (i.e., in response to reception of the monitoring information from the home appliance 30). In contrast, the central managing device 20 in which the communication status is the deactivated status does not send the monitoring information to the center server 10 in response to the occurrence of the event (i.e., in response to the reception of the monitoring information from the home appliance 30), but stores in the monitoring information buffer 26 the monitoring information supposed to be sent. The central managing device 20 sends the monitoring information stored in the monitoring information buffer 26 to the center server 10 when the communication status is switched to the activated status from the deactivated status.

The status setting unit 13 does not set the communication status of all the central managing devices 20 to the activated status. The status setting unit 13 sets the communication status of a part of the central managing devices 20 to the activated status. In response to the current load amount of the center server 10, the status setting unit 13 varies the number of the central managing devices 20 in which the communication status is set to the activated status. That is, an allowable number dynamically varies with the load amount of the center server 10.

Figure 5:
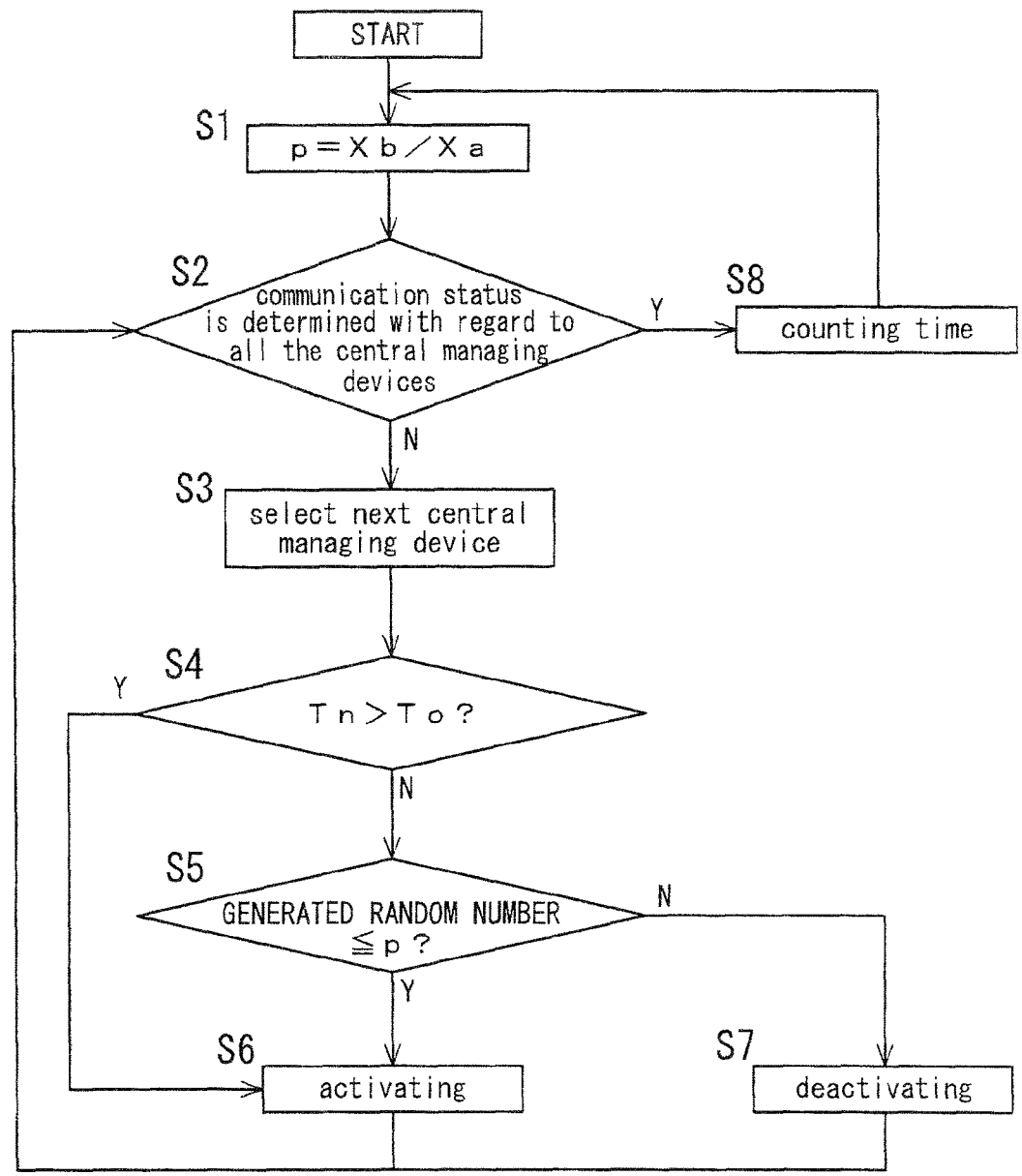
FIG. 5 is a flow chart illustrating the status setting processing of the central managing device of the above home appliance monitoring system.

The following explanation with FIG. 5 is made to the processing in which the status setting unit 13 determines the communication status of the central managing devices 20.

The status setting unit 13 determines the number (hereinafter, referred to as "allowable number") Xb of the central managing devices 20 in which the communication status is set to the activated status, on the basis of the current load amount of the center server 10 calculated by the load determination unit 12. Further, the status setting unit 13 calculates a value "p" (=Xb/Xa) obtained by dividing the allowable number Xb by a preliminarily-stored total number Xa of the central managing devices (S1). The status setting unit 13 decreases the allowable number Xb with an increase of the current load amount of the center server 10 calculated by the load determination unit 12, and increases the allowable number Xb with a decrease of the current load amount of the center server 10 calculated by the load determination unit 12. The allowable number Xb is determined with reference to the processing performance of the center server 10, the load on the center server 10 in the processing where the monitoring information is retrieved from the single central managing device 20, and the like.

Next, the status setting unit 13 selects one from the activated status and the deactivated status, as the communication status, with regard to all the central managing devices 20. The status setting unit 13 allocates identification numbers to the central managing devices 20, respectively in order. The identification numbers are integers incremented from a predetermined integer (e.g. "1"). For example, the status setting unit 13 preliminarily allocates the identification numbers 1, 2, 3, . . . (=n) to the central managing devices $20_1$, $20_2$, $20_3$, . . . , respectively. The status setting unit 13 judges whether or not the communication status is determined with regard to all the central managing devices 20 (S2). Upon judging that the communication status is determined with regard to none of the central managing devices 20, the status setting unit 13 performs the status setting processing with regard to the central managing device $20_1$ having the identification number "1", and subsequently the remaining central managing devices in ascending order of the identification number (S3).

In the present embodiment, the status setting unit 13 is configured to measure a period (continuation period) $T_n$ (n=1, 2, 3, . . . ) within which the communication status of the central managing device $20_n$ is kept in the deactivated status. The status setting unit 13 is configured to, upon acknowledging that the continuation period $T_n$ exceeds a predetermined threshold (deactivation allowable period To), determine to set the communication status of the central managing device 20 to the activated status.

For example, when the communication status of the central managing device $20_1$ is the deactivated status, the status setting unit 13 judges whether or not the continuation period $T_1$ of the central managing device $20_1$ exceeds the predetermined deactivation allowable period To (S4). Upon judging that the continuation period $T_1$ of the central managing device $20_1$ exceeds the predetermined deactivation allowable period To, the status setting unit 13 sets the communication status of the central managing device $20_1$ to the activated status forcibly (S6). Accordingly, it is possible to shorten a period within which no monitoring information is obtained from the central managing device $20_1$. Therefore, it is possible to maintain real-time response regarding the monitoring information obtained from the central managing device 20.

In contrast, upon judging that the continuation period $T_1$ of the central managing device $20_1$ does not exceed the predetermined deactivation allowable period To, the status setting unit 13 controls the random number generation unit 15 to generate the random number. The status setting unit 13 uses the above value "p" (=Xb/Xa) as a probability variable (probability information). The probability variable indicates probability that the communication status of the arbitrary central managing devices 20 is set to the activated status. That is, the probability variable is defined as probability for determining to set the communication status to the activated status with regard to each central managing device 20. The status setting unit 13 compares the probability variable (=p) with the random number (generated random number) generated by the random number generation unit 15 (S5). The status setting unit 13 sets the communication status of the central managing device $20_1$ to the activated status, when the generated random number does not exceed the probability variable (S6). The status setting unit 13 sets the communication status of the central managing device $20_1$ to the deactivated status, when the generated random number exceeds the probability variable (S7).

When the status setting unit 13 selects one from the activated status and the deactivated status as the communication status of the central managing device $20_1$, the status setting unit 13 judges whether or not the communication status is determined with regard to all the central managing devices 20 (S2). When the status setting is not completed with regard to all of the central managing devices 20, the central managing device $20_2$ with the identification number 2 is selected as the central managing device 20 which is the next target of the status setting performed by the status setting unit 13 (S3). Thereafter, the status setting unit 13 performs the processing of steps S4 to S7 in a similar manner as mentioned above, thereby performing the status setting of the central managing device $20_2$. Subsequently, the status setting unit 13 performs the status setting in a similar manner as mentioned above with regard to central managing devices $20_3$, $20_4$, . . . , $20_n$.

When the communication status is determined with regard to all of the central managing devices 20, the status setting unit 13 starts to measure the predetermined time Ts (S8), and controls the outside communication unit 11 in such a manner to send the activating instruction signal or the deactivating instruction signal to each of the central managing device 20 on the basis of the result of the status setting processing. As a result, the central managing device 20 receiving the activating instruction signal sets its communication status to the activated status, and the central managing device 20 receiving the deactivating instruction signal sets its communication status to the deactivated status. Besides, the status setting unit 13 may start to measure the predetermined time Ts after completion of sending the activating instruction signal or the deactivating instruction signal to all of the central managing devices 20. Alternatively, each time the communication status of the central managing device 20 is determined, the status setting unit 13 may start to measure the predetermined time Ts of the corresponding central managing device 20. Alternatively, each time the activation signal or the deactivation signal is sent to the central managing device 20, the status setting unit 13 may start to measure the predetermined time Ts of the corresponding central managing device 20.

With regard to the central managing device 20 in which the communication status is kept in the deactivated status, when the information collection unit 23 collects the monitoring information (when the information collection 23 receives the monitoring information sent by the corresponding home appliance 30 at the occurrence of the event), the communication control unit 25 stores the monitoring information collected by the information collection unit 23 in the monitoring information buffer 26. The communication control unit 25 sends the monitoring information stored in the monitoring information buffer 26 to the center server 10, when the communication status becomes the activated status.

In contrast, with regard to the central managing device 20 in which the communication status is kept in the activated status, when the information collection unit 23 collects the monitoring information, the communication control unit 25 sends the monitoring information collected by the information collection unit 23 to the center server 10. For example, the communication control unit 25 invokes a data collection API (Application Program Interface) from the center server 10, and inputs the monitoring information collected by the information collection unit 23 to it, thereby sending the monitoring information to the center server 10. In addition, when the communication status is switched from the deactivated status to the activated status, the communication control unit 25 sends the monitoring information stored in the monitoring information buffer 26 to the center server 10.

The status setting unit 13 returns to the step S1 after a lapse of the predetermined time Ts from the time of starting measurement. Consequently, the status setting unit 13 newly determines the communication status with regard to all of the central managing devices 20. Therefore, the status setting unit 13 can dynamically determine the number of the central managing devices 20 in which the communication status is the activated status, in response to the load amount of the center server 10. Thus, the collection processing of the monitoring information can be performed within the available range of the center server 10.

Figure 6:
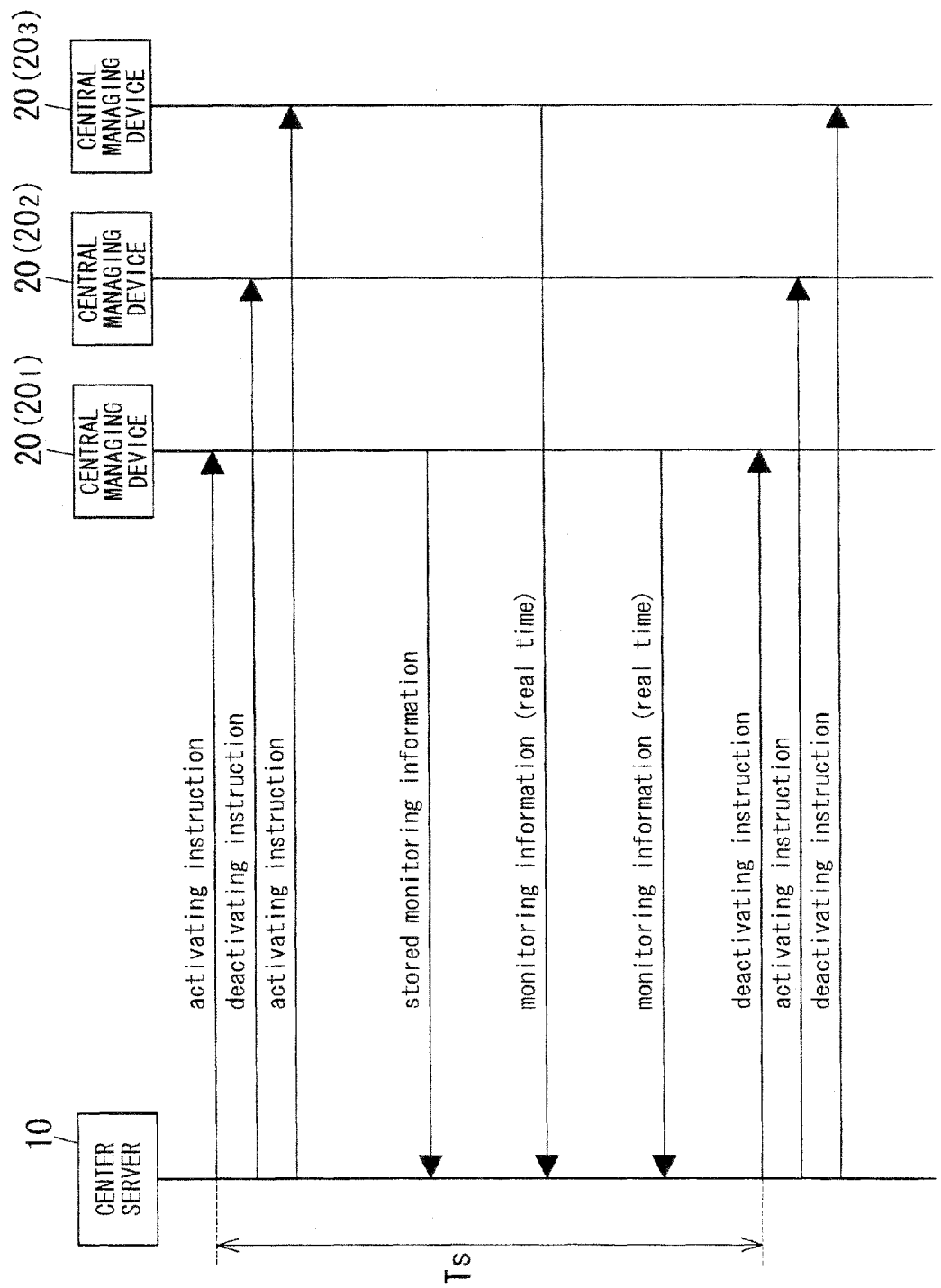
FIG. 6 is a sequence chart illustrating the operation of the above home appliance monitoring system.

For example, there are the three central managing devices 20 as shown in FIG. 6. When the center server 10 sends the activating instruction signal to each of the central managing devices $20_1$ and $20_3$ and sends the deactivating instruction signal to the central managing device $20_2$, the central managing devices $20_1$ and $20_3$ switch the communication status to the activated status and the central managing device $20_2$ switches the communication status to the deactivated status. In a situation where the central managing devices $20_1$ and $20_3$ store the monitoring information in the monitoring information buffer 26 while the communication status is the deactivated status, the central managing devices $20_1$ and $20_3$ send the monitoring information stored in the monitoring information buffer 26 to the center server 10 at the timing of switching the communication status to the activated status. Thereafter, each time the information collection unit 23 collects the monitoring information from the corresponding home appliance in response to the occurrence of the event, the central managing devices $20_1$ and $20_3$ send the monitoring information collected by the information collection unit 23 to the center server 10. The central managing device $20_2$ does not send the monitoring information collected by the information collection unit 23 from the corresponding home appliance 30, but stores the same in the monitoring information buffer 26. The center server 10 starts to measure the predetermined time Ts after the completion of the status setting processing with regard to all the central managing devices 20. Just when the predetermined time Ts elapses, the center server 10 newly performs the status setting processing of the central managing devices $20_1$ to $20_3$ on the basis of its own load amount. After that, the center server 10 sends, to each of the central managing devices $20_1$ to $20_3$, one selected from the activating instruction signal and the deactivating instruction signal on the basis of the result of the status setting processing.

As mentioned in the above, the home appliance monitoring system of the present embodiment includes the plurality of the home systems 50 and the center server 10. The home systems 50 are adapted to be installed in residences, respectively. Each home system 50 includes a central managing device 20 configured to collect the monitoring information from a home appliance 30. The center server 10 is adapted to be installed in premises different from the residences and connected to the central managing device 20 of each home system 50 via the Internet (transmission path).

The center server 10 includes the load determination unit 12, the status setting unit 13, and the monitoring information storage unit 14. The load determination unit 12 is configured to calculate the load amount of the center server 10. The status setting unit 13 is configured to perform the status setting processing of selecting one from the activated status and the deactivated status, as the communication status of each central managing device 20, on the basis of the load amount calculated by the load determination unit 12. The status setting unit 13 is configured to refer to the result of the status setting processing, and send, to each central managing device, one selected from the activating instruction signal indicative of setting the communication status to the activated status and the deactivating instruction signal indicative of setting the communication status to the deactivated status. The monitoring information storage unit 14 is configured to store the monitoring information received from the home system.

The central managing device 20 is configured to set the communication status to the activated status in response to receiving the activating instruction signal, and to set the communication status to the deactivated status in response to receiving the deactivating instruction signal. The home system 50 is configured to store the monitoring information while the communication status is set to the deactivated status. The home system 50 is configured to send the stored monitoring information to the center server 10 when the communication status is switched from the deactivated status to the activated status. The home system 50 is configured to collect the monitoring information from the home appliance 30 and send the same to the center server 10 while the communication status is set to the activated status.

In particular, the central managing device 20 includes the information collection unit 23 configured to receive the monitoring information from the home appliance 30, the monitoring information buffer 26, and the communication control unit 25. The communication control unit 25 is configured to set the communication status to the activated status in response to receiving the activating instruction signal, and set the communication status to the deactivated status in response to receiving the deactivating instruction signal. The communication control unit is configured to store the monitoring information received by the information collection unit 23 in the monitoring information buffer 26 while the communication status is set to the deactivated status. The communication control unit 25 is configured to send the monitoring information stored in the monitoring information buffer 26 to the center server 10 when the communication status is switched from the deactivated status to the activated status. The communication control unit 25 is configured to send the monitoring information received by the information collection unit 23 to the center server 10 while the communication status is set to the activated status.

According to the aforementioned home appliance monitoring system of the present embodiment, even if the system scale is expanded with an increase of the number of the central managing devices 20, the system can reduce the amount of load given at one time to the center server 10, thereby eliminating need of increasing the number of the center servers 10 or resorting to improve the performance of the center server 10. Therefore, the current center server 10 can be used as it is, and the cost can be reduced. That is, it is possible to reduce an increase of the cost resulting from the increase of the number of the central managing devices 20.

Besides, a management company of the center server 10 uses the monitoring information stored in the center server 10 to provide, to each family, various services such as a service of constantly monitoring on-off state of electric devices (home appliances), and a service of constantly monitoring the security status. Generally, such a service necessitates information processing of retrieving information from each family on a highly real-time basis. In addition, the management company provides, to each family, the secondary services which requires the information processing of using the information retrieved from each family and providing a report on an out of real-time basis. For example, the secondary service includes reporting the tendency of the power consumption of each home, and proposing a method for saving energy.

The home appliance monitoring system of the present embodiment is appropriate to the latter secondary service which does not require the highly real-time response.

In the home appliance monitoring system of the present embodiment, the center server 10 further includes the random number generation unit 15 configured to generate the random number. The status setting unit 13 is configured to determine, for each central managing device 20, the probability information indicative of the probability that the communication status is set to the activated status, on the basis of the load amount calculated by the load determination unit 12. The status setting unit 13 is configured to determine, on the basis of comparison between the probability indicated by the probability information and the random number generated by the random number generation unit 15, whether or not the communication status is set to the activated status.

As mentioned in the above, the central managing device 20 in which the communication status is switched to the activated status is selected from the central managing devices 20 by use of a random number. Therefore, the communication status of each central managing device 20 becomes the activated status at the same probability. Consequently, the monitoring information can be obtained from all the central managing devices 20 evenly.

In the home appliance monitoring system of the present embodiment, the status setting unit 13 is configured to measure the period (continuation period $T_n$) within which the communication status of the central managing device 20 is kept in the deactivated status. The status setting unit 13 is configured to, upon acknowledging that the period exceeds the predetermined threshold (deactivation allowable period To), determine to set the communication status of the central managing device 20 to the activated status.

Therefore, with regard to the central managing device 20 having the continuation period $T_n$ exceeding the deactivation allowable period To, the communication status is forced to set to the activated status. Accordingly, it is possible to shorten a period within which no monitoring information is obtained from the particular central managing device 20.

In the home appliance monitoring system of the present embodiment, the communication control unit 25 is configured to monitor data volume of the monitoring information stored in the monitoring information buffer 26. The communication control unit 25 is configured to, upon acknowledging that the data volume reaches predetermined volume, switch the communication status to the activated status.

Figure 7:
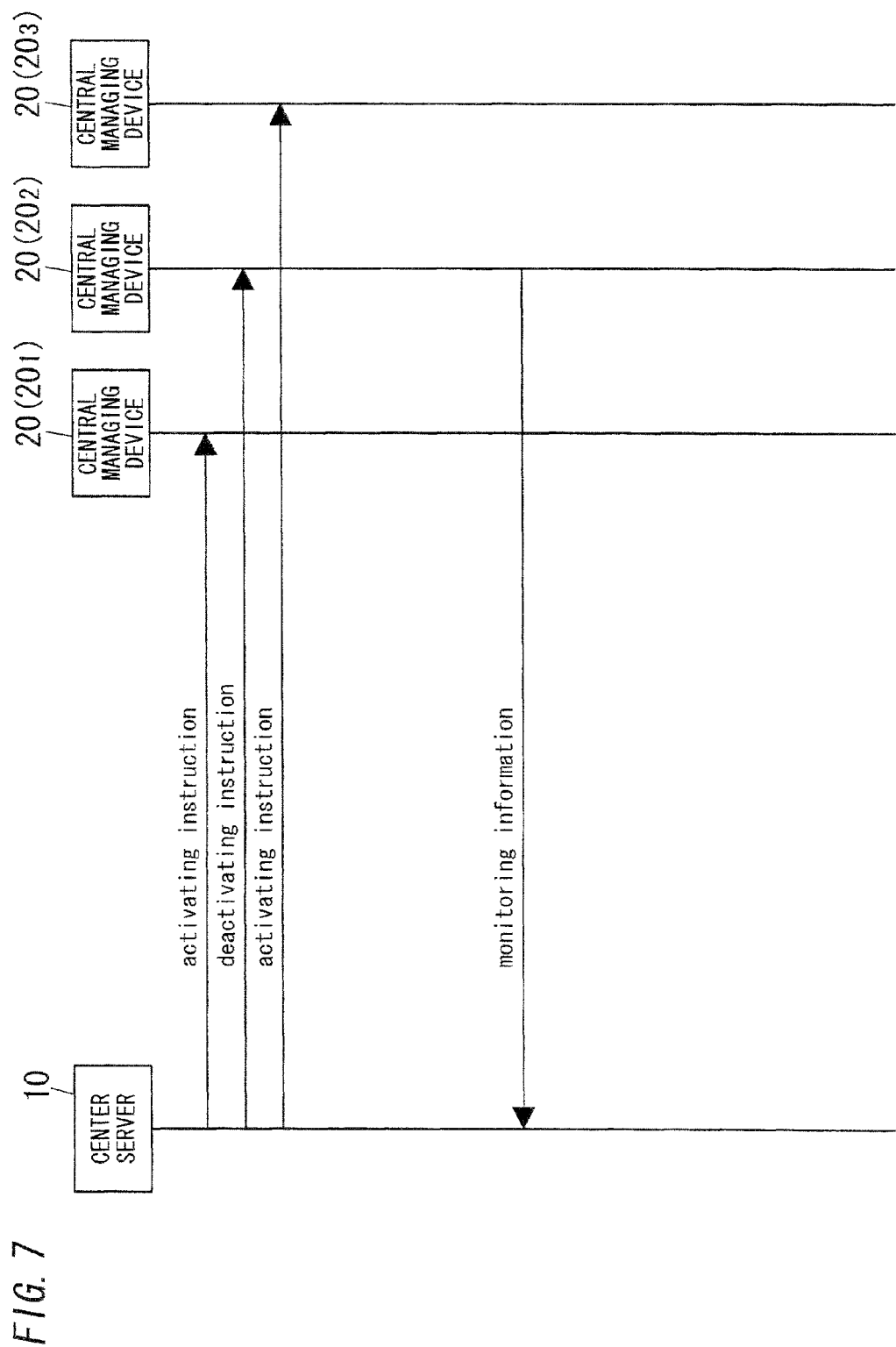
FIG. 7 is a sequence chart illustrating the operation of the above home appliance monitoring system.

For example, as shown in FIG. 7, the central managing device $20_2$ in which the communication status is set to the deactivated status stores the monitoring information collected by the information collection unit 23 in the monitoring information buffer 26. When the data volume of the monitoring information stored in the monitoring information buffer 26 reaches the predetermined volume (e.g., the maximum storage capacity of the monitoring buffer 26, and prescribed volume), the communication control unit 25 of the central managing device $20_2$ switches the communication status to the activated status and then sends the monitoring information stored in the monitoring information buffer 26 to the center server 10.

In this situation, loads would be concentrated on the center server 10. However, in contrast to an instance where no implementation is made to cure for lack of capacity of the monitoring information buffer 26, the maximum of the load on the center server 10 can be reduced.

Figure 8:
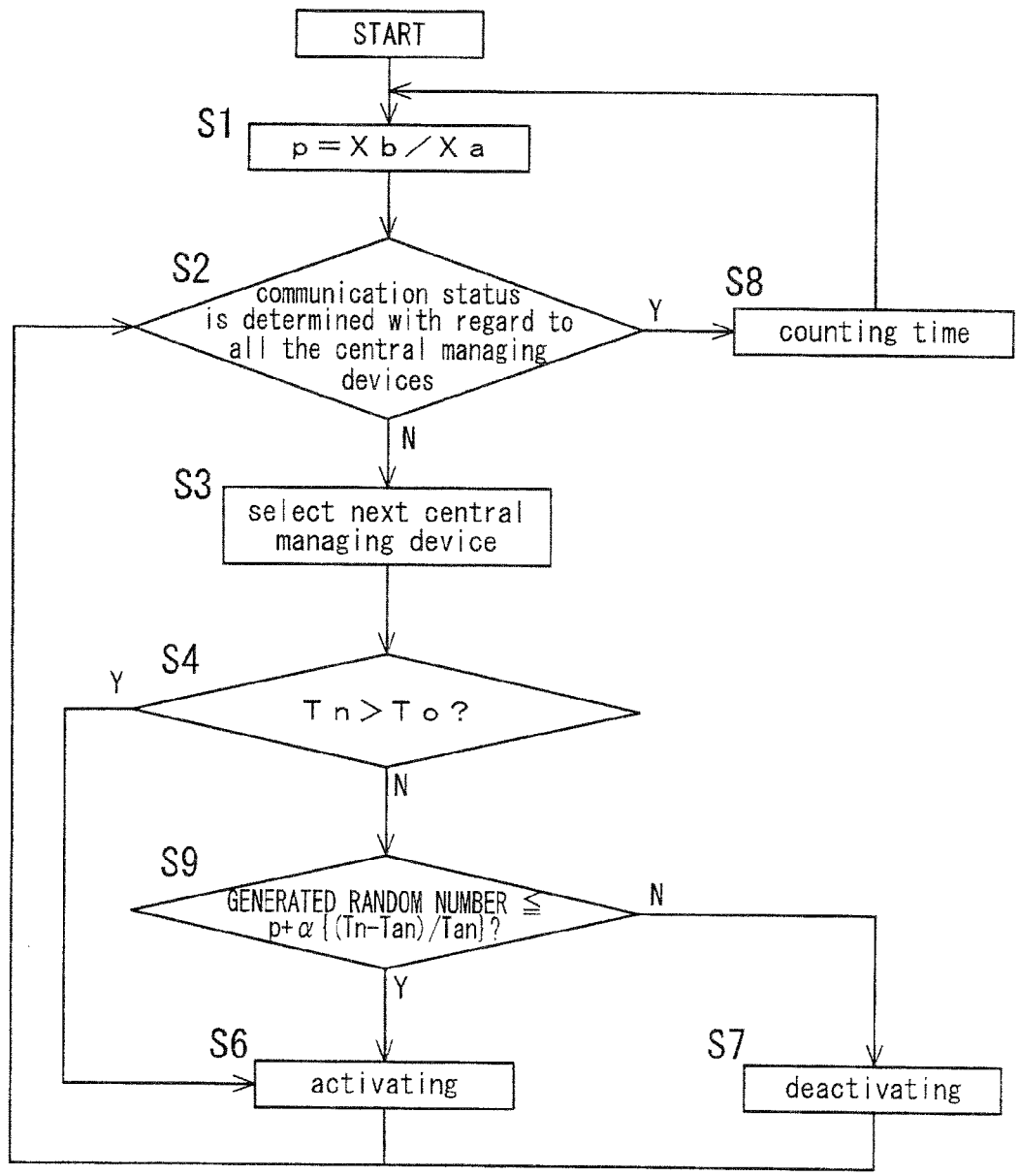
FIG. 8 is a flow chart illustrating the modified status setting processing of the central managing device of the above home appliance monitoring system.

Alternatively, as shown in FIG. 8, the status setting unit 13 may be configured to perform the status setting processing of the central managing device 20. Besides, the flow chart shown in FIG. 8 is different from the flow chart shown in FIG. 5 in that the step S5 is replaced by the step S9.

In the step S9, the status setting unit 13 determines a probability for each the central managing device 20. The status setting unit 13 adopts $[p+\alpha\{(T_n-Ta_n)/Ta_n\}]$ as the probability variable instead of the aforementioned "p". The above "$\alpha$" is a constant and less than "1". "$Ta_n$" is defined as an average of the continuation periods $T_n$ of the central managing device $20_n$. Therefore, the probability variable is decreased from "p" with a decrease of the continuous period $T_n$ from $Ta_n$, and the probability variable is increased from "p" with an increase of the continuous period $T_n$ from $Ta_n$.

The status setting unit 13 compares the generated random number with the probability variable $(=[p+\alpha\{(T_n-Ta_n)/Ta_n\}])$. Upon judging that the generated random number does not exceed the probability variable, the status setting unit 13 determines to set the communication status of the central managing device $20_n$ to the activated status (S6). Upon judging that the generated random number exceeds the probability variable, the status setting unit 13 determines to set the communication status of the central managing device $20_n$ to the deactivated status (S7).

As described in the above, the status setting unit 13 measures the period (continuation period $T_n$) within which no monitoring information is obtained from the central managing device 20, and increases the probability (probability of setting the communication status to the activated status) with an increase of the period.

In other words, the status setting unit 13 selects the probability variable such that the probability is increased with an increase of the continuation period $T_n$, with regard to each of the central managing devices 20. Therefore, the monitoring information can be obtained from all the central managing devices 20 more evenly.

Besides, the home system 50 may include the plural home appliances 30 having the monitoring information of different classes. In this instance, the status setting unit is configured to allocate a priority rank to the class of the monitoring information. Further, the status setting unit 13 is configured to calculate a distribution of the priority rank of the monitoring information for each central managing device 20, on the basis of the monitoring information received from the central managing device 20. Moreover, the status setting unit 13 is configured to increase the probability to a greater extent to the central managing device 20 which exhibits the distribution in which the priority ranks are offset closer to a high side.

For example, the monitoring information relating to security has the relatively high priority rank, and the monitoring information relating to operation condition of lighting equipment, air conditioning equipment, or the like has the relatively low priority rank. That is, the priority rank is determined based on importance of the monitoring information.

With this configuration, the higher probability is selected for the central managing device 20 having the higher percentage of sending the important monitoring information of higher priority rank, and the lower probability is selected for the central managing device 20 having the lower percentage of sending the important monitoring information of lower priority rank.

Consequently, in a whole system, the number of times of transmission of the monitoring information of the high priority rank from the central managing device 20 to the center server 10 is increased. Therefore, the opportunity for the center server 10 to obtain the important information is ° increased, and it is possible to improve quality of the service provided to users.

Alternatively, the status setting unit 13 may preliminarily determine the priority rank of the central managing device 20. In this instance, the status setting unit 13 selects the higher probability for the central managing device 20 having the higher priority rank. For example, the priority rank of the central managing device 20 may be determined on the basis of contract with a resident of a residence in which a central managing device 20 is installed. For example, the central managing device having the larger number of contract services or the higher contract ranking may have the higher priority rank.

Second Embodiment

The home appliance monitoring system of the present embodiment is different from the home appliance monitoring system of the first embodiment in the center server 10A. Besides, components common to the home appliance monitoring system of the present embodiment and the home appliance monitoring system of the first embodiment are designated by the same reference numerals, and no explanations thereof are deemed necessary.

Figure 9:
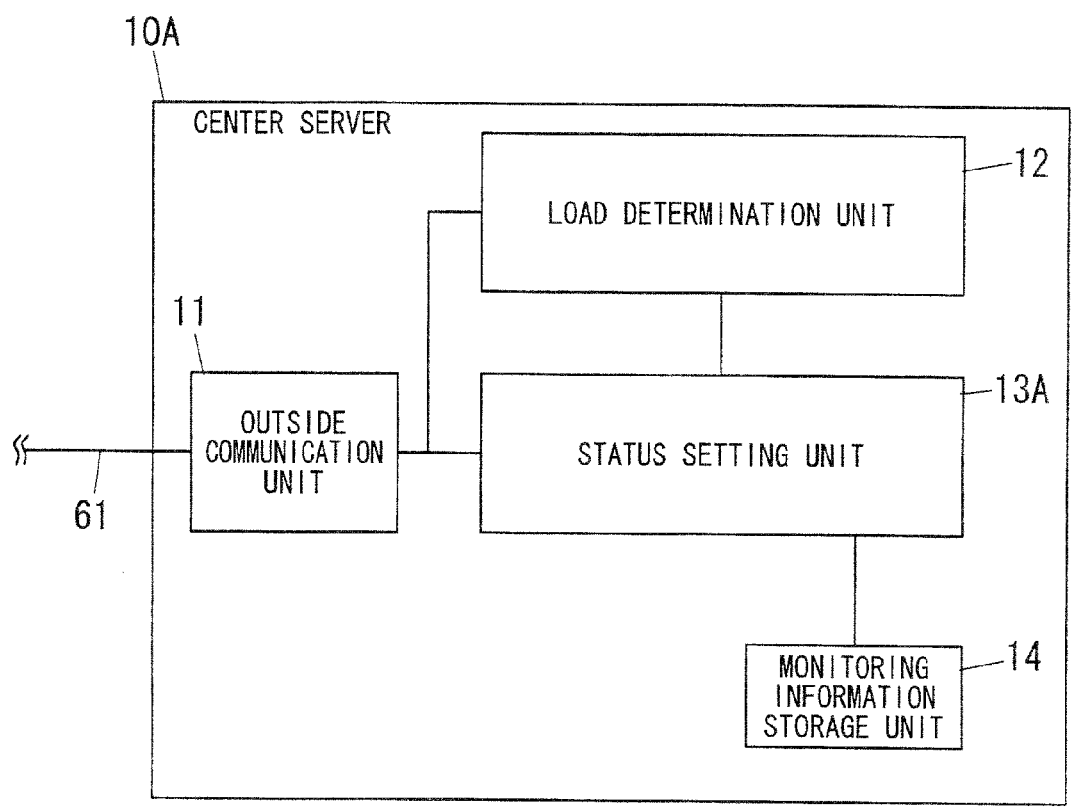
FIG. 9 is a block diagram illustrating the configuration of the center server of the home appliance monitoring system of the second embodiment.

The center server 10A includes, as shown in FIG. 9, the outside communication unit 11, the load determination unit 12, the status setting unit 13A, and the monitoring information storage unit 14.

Figure 10:
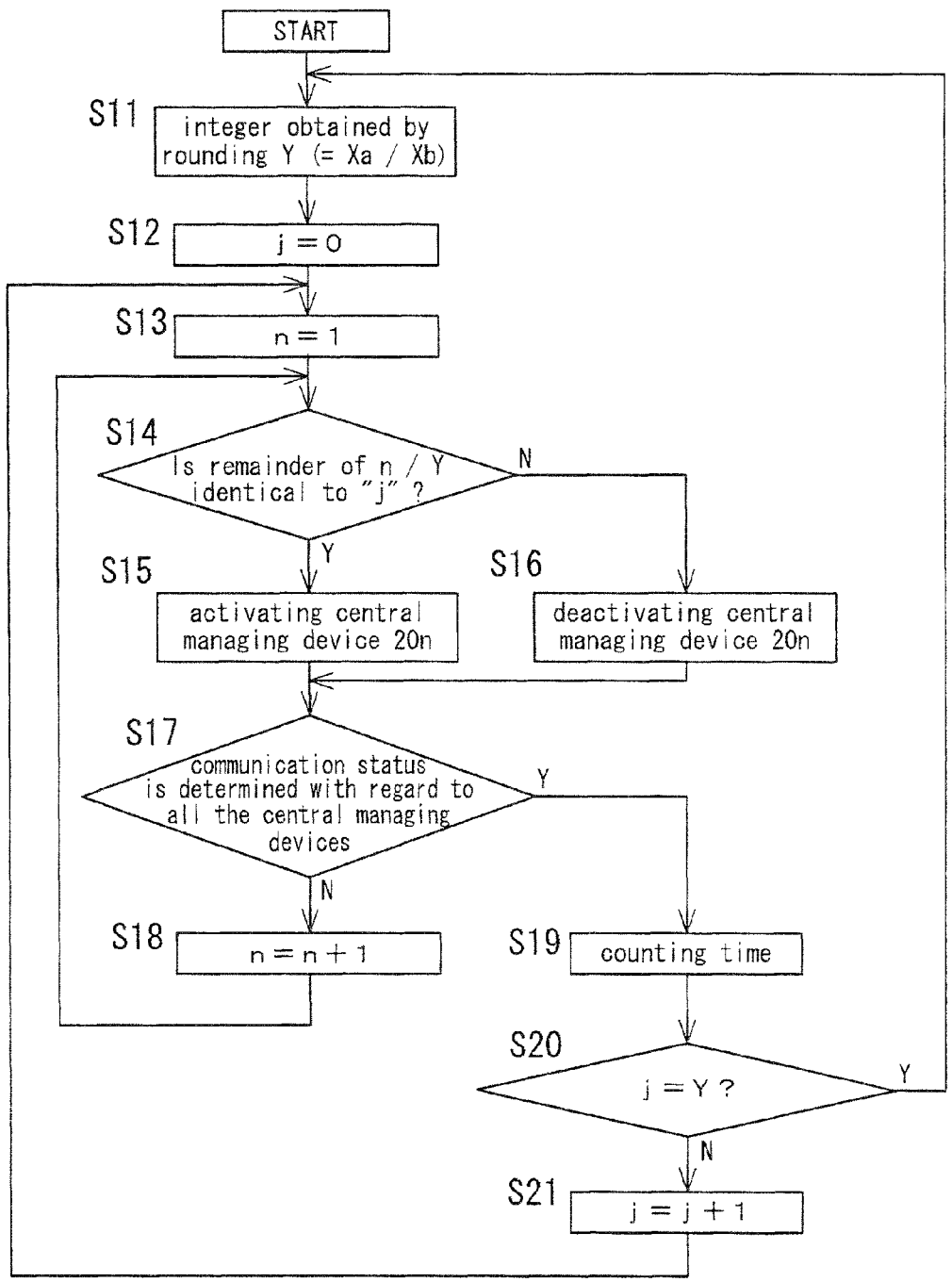
FIG. 10 is a flow chart illustrating the status setting processing of the central managing device of the above home appliance monitoring system.

The following explanation with FIG. 10 is made to the processing in which the status setting unit 13A determines the communication status of the central managing devices 20.

The status setting unit 13A determines the allowable number Xb on the basis of the current load amount of the center server 10 calculated by the load determination unit 12. Further, the status setting unit 13 rounds the quotient of the total number Xa of the central managing devices 20 and the allowable number Xb, thereby calculating an integer "Y" (S11).

Next, the status setting unit 13A divides all the central managing devices 20 into plural groups. In brief, the status setting unit 13A selects one from the activated status and the deactivated status for each group. The maximum number of the central managing devices 20 per one group is the allowable number Xb. In addition, the number of the group is equal to "Y". Therefore, an increase in the current load amount of the center server 10 (a decrease in available capacity of the center server 10) causes a decrease in the allowable number Xb. Thereby, the groups in the number "Y" predominate. To the contrary, a decrease in the current load amount of the center server 10 (an increase in available resource of the center server 10) causes an increase in the allowable number Xb. Thereby, the groups in the number of "Y" diminish.

In order to perform grouping, the status setting unit 13A allocates the identification numbers "n" to the central managing devices 20, respectively in order. The identification numbers "n" are integers incremented from a predetermined integer (e.g. "1"). Further, the status setting unit 13A determines an internal parameter "j". Firstly, the status setting unit 13A sets the internal parameter "j" to "0" (S12), and selects "1" as the identification number "n" (S13). Subsequently, the status setting unit 13A judges whether or not a remainder obtained by dividing the identification number "n" (=1) selected by the status setting unit 13A by the integer "Y" is equal to the internal parameter "j" (=0) (S14). When the remainder obtained by dividing the identification number "n" (=1) by the integer "Y" is identical to the internal parameter "j" (=0), the communication status of the central managing device 20 ($20_1$) with the identification number "n" (=1) is determined to be set to the activated status (S15). When the remainder obtained by dividing the identification number "n" (=1) by the integer "Y" is not equal to the internal parameter "j" (=0), the communication status of the central managing device 20 ($20_1$) with the identification number "n" (=1) is determined to be set to the deactivated status (S16).

Thereafter, the status setting unit 13A judges whether or not the communication status is determined with regard to all the central managing devices 20 (S17). In this situation, the communication status has not yet been determined with regard to the central managing devices $20_2$, $20_3$, . . . . Therefore, the identification number "n" is increased by one and thereby "n" becomes "2" (S18). Thereafter, the status setting unit 13A returns to the step S14. Accordingly, the communication status of the central managing device $20_2$ will be determined. Similarly, the communication status is determined with regard to the remaining central managing device 20. Thus, the communication status is determined to be set to the activated status with regard to only the central managing device 20 in which the remainder obtained by dividing the identification number "n" by the integer "Y" determined based on the current load amount of the center server 10 is equal to "j" (=0).

In the step S17, when the setting of the communication status is completed with regard to all the central managing device 20, the status setting unit 13A starts to count the predetermined period Ts (S19), and sends the activating instruction signal or the deactivating instruction signal to each central managing device 20 on the basis of the result of the status setting processing. As a result, the central managing device 20 receiving the activating instruction signal sets its communication status to the activated status, and the central managing device 20 receiving the deactivating instruction signal sets its communication status to the deactivated status.

The status setting unit 13A judges whether or not the internal parameter "j" is equal to "Y" after a lapse of the predetermine time Ts (S20). When the internal parameter "j"=0, the internal parameter "j" is not equal to "Y", and therefore the internal parameter "j" is incremented, and becomes "1" (S21). Thereafter, the status setting unit 13A returns to the step S13. Thus, with repeating the aforementioned processing, the communication status is kept in the activated status for the predetermined time Ts with regard to only the central managing device 20 in which the remainder obtained by dividing the identification number "n" by the integer "Y" determined by the current load amount of the center server 10 is equal to "j" (=1). Subsequently, this processing is repeated until the internal parameter "j" becomes equal to "Y" in the step S20. Accordingly, with regard to only the central managing device 20 in which the remainder obtained by dividing the identification number "n" by the integer "Y" determined by the current load amount of the center server 10 is identical to "j" (=3, 4, . . . ), the communication status is kept in the activated status for the predetermined time Ts.

The fact that the internal parameter "j" is equal to the integer "Y" in the step S20 means that the setting of the activated status and the deactivated status by use of the initially determined integer "Y" for each group has been performed with regard to all the central managing devices 20. When the internal parameter "j" reaches the integer "Y", the processing is returned to the step S11. Thereafter, the integer "Y" is newly determined on the basis of the current load amount of the center server 10 which is newly calculated by the load determination unit 12. Accordingly, the status setting unit 13A performs the status setting processing by use of the newly determined integer "Y".

As described in the above, in the home appliance monitoring system of the present embodiment, the status setting unit 13A is configured to determine the number of the central managing devices 20 per one group on the basis of the load amount calculated by the load determination unit 12, and classify all of the central managing devices 20 into plural groups. The status setting unit 13A is configured to select one from the plural groups as an activation group in which the communication status of the central managing device 20 is set to the activated status, and select a rest of the plural groups as a deactivation group in which the communication status of the central managing device 20 is set to the deactivated status. The status setting unit 13A is configured to switch the group selected as the activation group at a predetermined timing. In this instance, the predetermined timing is defined as a timing at which the predetermined period Ts elapses from the time of completion of the status setting for all the central managing devices 20.

Therefore, all the central managing devices 20 are divided into the group in the number equal to the integer "Y" on the basis of their identification numeral "n". The status setting unit 13A performs the status setting of the central managing device 20 per one group. The integer "Y" is determined based on the current load amount of the center server 10. Therefore, the number of the central managing devices 20 in a group is decreased with an increase in the current load amount of the center server 10 and a decrease in available capacity of the center server 10. To the contrary, the number of the center managing devices 20 in a group is increased with a decrease in the current load amount of the center server 10 and an increase in available resource of the center server 10. Accordingly, the number of the central managing devices 20 having the communication status set to the activated status can be varied with the load amount of the center server 10. Thus, the collection processing of the monitoring information can be performed within the given capacity of the center server 10.

According to the aforementioned home appliance monitoring system of the present embodiment, even if the system scale is expanded with an increase of the number of the central managing devices 20, the system also can reduce the amount of load given at one time to the center server 10, thereby eliminating the need of increasing the number of the center servers 10 or resorting to improve the performance of the center server 10. Therefore, the current center server 10 can be used as it is, and the cost can be reduced. That is, it is possible to reduce an increase of the cost resulting from the increase of the number of the central managing devices 20.

The group in which the communication status of the central managing device 20 is set to the activated status is selected sequentially. Consequently, the monitoring information can be obtained from all the central managing devices 20 evenly.

In particular, the status setting unit 13A is configured to allocate the identification numbers "n" to the central managing devices 20, respectively in order. The identification numbers "n" are defined as integers incremented from a predetermined integer (e.g., "1"). The status setting unit 13A is configured to classify, on the basis of a remainder of dividing the identification number "n" of the central managing device 20 by the divisor "Y" which is not less than "2", all of the central managing devices into the plural groups in the number equal to the divisor "Y".

With this arrangement, it is possible to simplify the method of grouping of the central managing device 20.

Additionally, the home appliance monitoring system of the present embodiment forcibly sets the communication status to the activated status irrespective of the group with regard to the central managing device 20 having the continuation period $T_n$ exceeding the deactivation allowable period To. Accordingly, it is possible to shorten a period within which no monitoring information is obtained from the particular central managing device.

Third Embodiment

The home appliance monitoring system of the present embodiment is different from the home appliance monitoring system of the first embodiment in the status setting unit 13. Besides, except for the status setting unit 13, components common to the home appliance monitoring system of the present embodiment and the home appliance monitoring system of the first embodiment are designated by the same reference numerals, and no explanations thereof are deemed necessary.

The status setting unit 13 of the present embodiment classifies all the central managing devices 20 into plural groups (i.e., sets of the central managing devices 20 or central managing device groups) on the basis of time patterns each indicative of timing at which the central managing device 20 sends the monitoring information. The status setting unit 13 selects, for each group, a different time period within which the communication status of the central managing device 20 is kept in activated status.

The status setting unit 13 of the present embodiment is configured to store, for each central managing device 20, a history indicative of a time (timing) of reception of the monitoring information from the central managing device. The status setting unit 13 is configured to generate, on the basis of the history, the time pattern indicative of transmission time defined as time at which the central managing device 20 sends the monitoring information to the center server 10 and non-transmission time defined as time at which the central managing device 20 sends no monitoring information to the center server 10. The status setting unit 13 is configured to calculate a degree of similarity between the time patterns of the central managing devices 20. The status setting unit 13 is configured to determine, on the basis of a comparison of the degree of the similarity and a predetermined threshold, whether or not the time patterns are similar to each other. The status setting unit 13 is configured to classify the central managing devices 20 having the time patterns similar to each other into the same group, and classify the central managing devices 20 having the time patterns dissimilar to each other into different groups. The status setting unit 13 is configured to, with regard to the central managing devices 20 belonging to the same group, send the activation indication signal such that the communication status of the central managing device 20 is kept in the activated status for the transmission time of the time pattern corresponding to the group, and send the deactivation indication signal such that the communication status of the central managing device 20 is kept in the deactivated status for the non-transmission time of the time pattern corresponding to the group.

In brief, according to the home appliance monitoring system of the present embodiment, the status setting unit 13 of the center server 10 analyzes the time pattern (sending time pattern) indicative of time at which the central managing device 20 sends the monitoring information, on the basis of the history of the monitoring information received from the central managing device 20, for each central managing device 20. The status setting unit 13 classifies the central managing devices 20 indicating the similar sending time pattern into the same group (central managing device group). When the degree of the similarity between the sending patterns is not less than a predetermined threshold, the status setting unit 13 determines that the sending time patterns are similar to each other. Varying the predetermined threshold enables adjusting the number of the central managing devices 20 belonging to the same group.

For example, the status setting unit 13 is configured to classify all the central managing devices 20 into four groups. The four groups include a first group G1 corresponding to a morning, a second group G2 corresponding to a daytime, a third group G3 corresponding to an evening, and a fourth group G4 corresponding to a night. The status setting unit 13 classifies, into the first group G1, the central managing device 20 which sends the monitoring info nation frequently in a morning. The status setting unit 13 classifies, into the second group G2, the central managing device 20 sending the monitoring information frequently in a daytime. The status setting unit 13 classifies, into the third group G3, the central managing device 20 sending the monitoring information frequently in an evening. The status setting unit 13 classifies, into the fourth group G4, the central managing device 20 sending the monitoring information frequently in a night. When the current time period is a morning (e.g., 5:00 to 11:00), the status setting unit 13 selects the central managing device 20 classified into the first group G1 as a target for determining the communication status. When the current time period is a daytime (e.g., 11:00 to 15:00), the status setting unit 13 selects the central managing device 20 classified into the second group G2 as the target for determining the communication status. When the current time period is an evening (e.g., 15:00 to 19:00), the status setting unit 13 selects the central managing device 20 classified into the third group G3 as the target for determining the communication status. When the current time period is a daytime (e.g., 19:00 to next day 5:00), the status setting unit 13 selects the central managing device 20 classified into the fourth group G4 as the target for determining the communication status. In brief, the status setting unit 13 selects the target (the central managing device 20 having the probability that the communication status is set to the activated status) for determining the communication status, in response to the current time period. The status setting unit 13 determines the communication status in a similar manner as the first embodiment, with regard to the central managing device 20 belonging to the group corresponding to the current time period. The status setting unit 13 determines to set the communication status to the deactivated status, with regard to the central managing device 20 belonging to the group which is not corresponding to the current time period.

For example, when the current time period is corresponding to a morning, the status setting unit 13 determines the communication status in a similar manner as the first embodiment with regard to the central managing device 20 belonging to the first group G1 (see FIGS. 5 and 8), and determines to set the communication status to the deactivated status with regard to the central managing device 20 belonging to any one of the remaining groups G2, G3, and G4. When the current time period shifts into the daytime, the status setting unit 13 determines the communication status in a similar manner as the first embodiment with regard to the central managing device 20 belonging to the second group G2, and determines to set the communication status to the deactivated status with regard to the central managing device 20 belonging to any one of the remaining groups G1, G3, and G4. Similarly, when the current time period shifts into the evening, the status setting unit 13 determines the communication status in a similar manner as the first embodiment with regard to the central managing device 20 belonging to the second group G3, and determines to set the communication status to the deactivated status with regard to the central managing device 20 belonging to any one of the remaining groups G1, G2, and G4. When the current time period shifts into the night, the status setting unit 13 determines the communication status in a similar manner as the first embodiment with regard to the central managing device 20 belonging to the fourth group G4, and determines to set the communication status to the deactivated status with regard to the central managing device 20 belonging to any one of the remaining groups G1, G2, and G3.

Besides, the status setting unit 13 may determine the communication status in a similar manner as the second embodiment. For example, when the current time period is corresponding to the morning, the status setting unit 13 determines the communication status in a similar manner as the second embodiment with regard to the central managing device 20 belonging to the second group G1 (see FIG. 10), and determines to set the communication status to the deactivated status with regard to the central managing device 20 belonging to any one of the remaining groups G2, G3, and G4. When the current time period shifts into the daytime, the status setting unit 13 determines the communication status in a similar manner as the second embodiment with regard to the central managing device 20 belonging to the second group G2, and determines to set the communication status to the deactivated status with regard to the central managing device 20 belonging to any one of the remaining groups G1, G3, and G4. Similarly, when the current time period shifts into the evening, the status setting unit 13 determines the communication status in a similar manner as the second embodiment with regard to the central managing device 20 belonging to the third group G3, and determines to set the communication status to the deactivated status with regard to the central managing device 20 belonging to any one of the remaining groups G1, G2, and G4. When the current time period shifts into the night, the status setting unit 13 determines the communication status in a similar manner as the second embodiment with regard to the central managing device 20 belonging to the fourth group G4, and determines to set the communication status to the deactivated status with regard to the central managing device 20 belonging to any one of the remaining groups G1, G2, and G3.

As described in the above, the home appliance monitoring system of the present embodiment sets the communication status of the central managing device 20 to the activated status in the time period within which the central managing device 20 sends the monitoring information to the center server 10 with the high probability. Therefore, it is possible to improve real time updating of the monitoring information which the center server 10 obtains from the central managing device 20.

Fourth Embodiment

The home appliance monitoring system of the present embodiment is different from the home appliance monitoring system of the first embodiment in the central managing device 20B and the home appliance 30B. Besides, components common to the home appliance monitoring system of the present embodiment and the home appliance monitoring system of the first embodiment are designated by the same reference numerals, and no explanations thereof are deemed necessary. Besides, the central managing device 20B and home appliance 30B of the present embodiment can be applied to the second embodiment.

Figure 11:
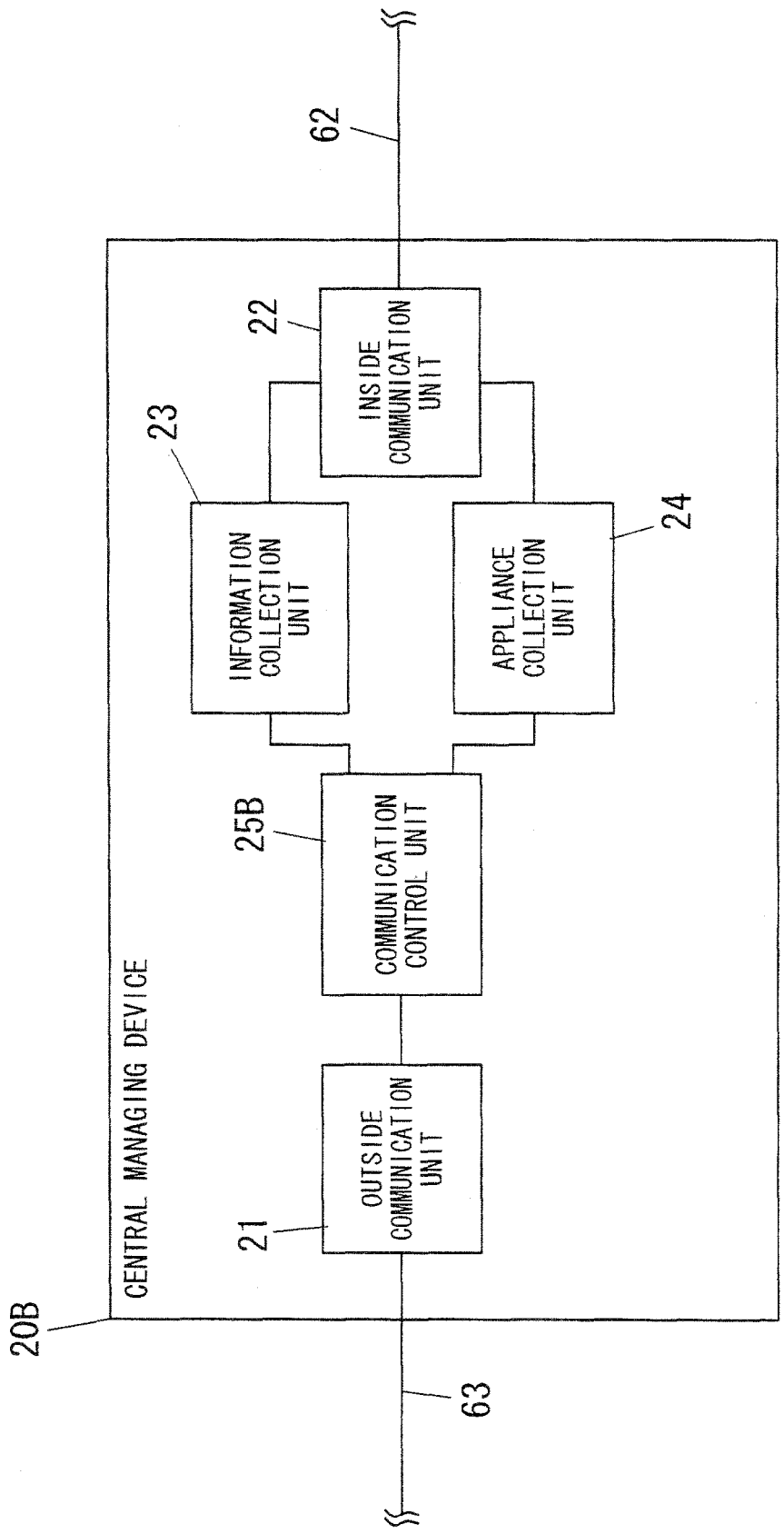
FIG. 11 is a block diagram illustrating the configuration of the central managing device of the home appliance monitoring system of the fourth embodiment.

As shown in FIG. 11, the central managing device 20B includes the outside communication unit 21, the inside communication unit 22, the information collection unit 23, the appliance control unit 24, and the communication control unit 25B.

The communication control unit 25B is configured to, in response to reception of the activating instruction signal from the center server 10, send a transmission signal to the home appliance 30B to announce that the communication status is the activated status. The communication control unit 25B is configured to, in response to reception of the deactivating instruction signal from the center server 10, send an accumulation signal to the home appliance 30B to announce that the communication status is the deactivated status.

That is, the central managing device 20B is configured to, upon receiving the activating instruction signal, announce to the home appliance 30B that the communication status is the activated status, and to, upon receiving the deactivating instruction signal, announce to the home appliance 30B that the communication status is the deactivated status.

Figure 12:
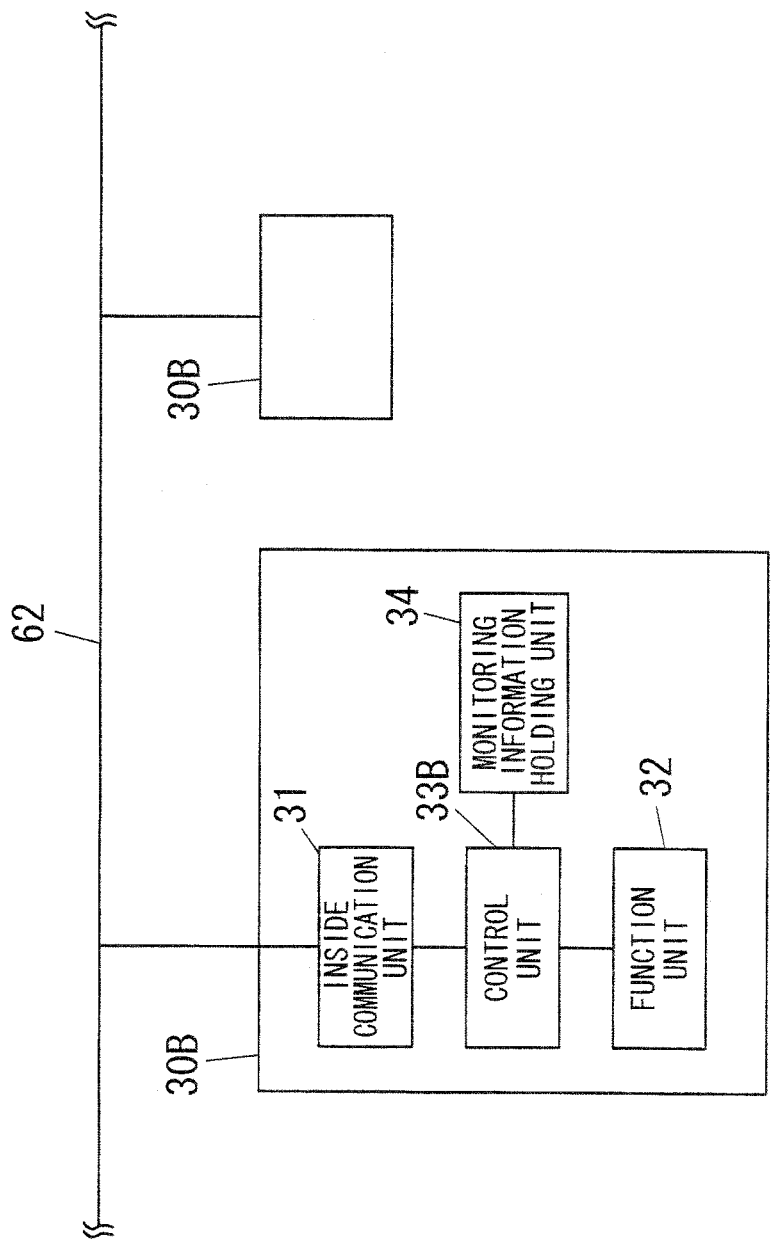
FIG. 12 is a block diagram illustrating the configuration of the home appliance of the above home appliance monitoring system.

As shown in FIG. 12, the home appliance 30B includes the inside communication unit 31, the function unit 32, the control unit 33B, and a monitoring information holding unit 34.

The monitoring information holding unit 34 is used for storing the monitoring information generated by the function unit 32 while the communication status of the corresponding central managing device 20B is the deactivated status.

The control unit 33B is configured to, in response to reception of the transmission signal from the central managing device 20B, judge that the communication status of the central managing device 20B is switched from the deactivated status to the activated status. The control unit 33B is configured to, in response to reception of the accumulation signal from the central managing device 20B, judge that the communication status of the central managing device 20B is switched from the activated status to the deactivated status.

The control unit 33B is configured to store the monitoring information created by the function unit 32 in the monitoring information holding unit 34 while the communication status is set to the deactivated status. The control unit 33B is configured to, when the communication status is switched from the deactivated status to the activated status, control the inside communication unit 31 in such a manner to send, to the central managing device 20B, the monitoring information stored in the monitoring information holding unit 34 while the communication status is set to the deactivated status. The control unit 33B is configured to send the monitoring information created by the function unit 32 to the central managing device 20B via the inside communication unit 31 while the communication status is the activated status.

In brief, the home appliance 30B stores the monitoring information while the communication status is set to the deactivated status. When the communication status is switched from the deactivated status to the activated status, the home appliance 30B sends, to the central managing device 20B, the monitoring information which the home appliance 30B stores while the communication status is the deactivated status. The home appliance 30B sends the monitoring information to the central managing device 20B while the communication status is set to the activated status.

According to the aforementioned home appliance monitoring system of the present embodiment, even if the system scale is expanded with an increase of the number of the central managing devices 20B, the system can also reduce the amount of load given at one time to the center server 10, thereby eliminating the need of increasing the number of the center servers 10 or resorting to improve the performance of the center server 10. Therefore, the current center server 10 can be used as it is, and the cost can be reduced. That is, it is possible to reduce an increase of the cost resulting from the increase of the number of the central managing devices 20B.

The invention claimed is:

1. A home appliance monitoring system comprising:
 a plurality of home systems adapted to be installed in residences respectively, each home system including a central managing device including a processor configured to collect monitoring information from a home appliance; and
 a center server adapted to be installed in premises different from the residences and connected to said central managing device of each home system via a transmission path,
 wherein said center server comprises a processor and memory having code stored therein that when executed causes the processor to execute:
  a load determination unit;
  a status setting unit; and
  a monitoring information storage unit,
 said load determination unit being configured to calculate a load amount of said center server,
 said status setting unit being configured to perform a status setting processing of selecting one from an activated status and a deactivated status, as a communication status for each central managing device, on the basis of the load amount calculated by said load determination unit,
 said status setting unit being configured to refer to a result of the status setting processing, and send, to each central managing device, one selected from an activating instruction signal indicative of setting the communication status to the activated status and a deactivating instruction signal indicative of setting the communication status to the deactivated status,
 said central managing device being configured to set the communication status to the activated status in response to receiving the activating instruction signal, and to set the communication status to the deactivated status in response to receiving the deactivating instruction signal,
 said home system being configured to collect the monitoring information from said home appliance and send the same to said center server via said transmission path while the communication status is set to the activated status,
 said monitoring information storage unit being configured to store the monitoring information received from said home system,
 said home system being configured to, while the communication status is set to the deactivated status, not send the monitoring information to said center server but store the monitoring information, and to, when the communication status is switched from the deactivated status to the activated status, send the stored monitoring information to said center server via said transmission path,
 said center server further comprises a random number generation unit configured to generate a random number in order to determine the communication status as activated or deactivated,
 said status setting unit being configured to determine, for each central managing device, probability information indicative of a probability that the communication status is set to the activated status, on the basis of the load amount calculated by said load determination unit,
 said status setting unit being configured to determine, on the basis of comparison between the probability indicated by the probability information and the random number generated by said random number generation unit, whether or not the communication status is set to the activated status,
 said status setting unit is configured to measure a period within which no monitoring information is obtained from said central managing device, and increase the probability with an increase of the period.

2. A home appliance monitoring system as set forth in claim 1, wherein said central managing device comprises:
 an information collection unit configured to receive the monitoring information from the home appliance; a monitoring information buffer;
 and a communication control unit, said communication control unit being configured to set the communication status to the activated status in response to receiving the activating instruction signal,
 and set the communication status to the deactivated status in response to receiving the deactivating instruction signal, said communication control unit being configured to store the monitoring information received by said information,
 collection unit in said monitoring information buffer while the communication status is set to the deactivated status, said communication control unit being configured to send the monitoring information stored in said monitoring information buffer to said center server via said transmission path when the communication status is switched from the deactivated status to the activated status, and said communication control unit being configured to send the monitoring information received by said information collection unit to said center server via said transmission path while the communication status is set to the activated status.

3. A home appliance monitoring system as set forth in claim 1, wherein said home system comprises said home appliance, said central managing device being configured to, upon receiving the activating instruction signal, announce to said home appliance that the communication status is the activated status, and to, upon receiving the deactivating instruction signal, announce to said home appliance that the communication status is the deactivated status, said home appliance being configured to store the monitoring information while the communication status is set to the deactivated status, said home appliance being configured to send, to said central managing device, the monitoring information which said home appliance stores while the communication status is the deactivated status, when the communication status is switched from the deactivated status to the activated status, said home appliance being configured to send the monitoring information to said central managing device while the communication status is set to the activated status, and said central managing device being configured to send, to said center server, the monitoring status received from said home appliance while the communication status is the activated status.

4. A home appliance monitoring system as set forth in claim 1, wherein said status setting unit is configured to determine the number of said central managing devices per one group on the basis of the load amount calculated by said load determination unit, and classify all of said central managing devices into plural groups, said status setting unit being configured to select one from the plural groups as an activation group in which the communication status of said central managing device is set to the activated status, and select a rest of the plural groups as a deactivation group in which the communication status of said central managing device is set to the deactivated status, and said status setting unit being configured to switch the group selected as the activation group at a predetermined timing.

5. A home appliance monitoring system as set forth in claim 4, wherein said status setting unit is configured to allocate identification numbers to said central managing devices, respectively in order, said identification numbers being defined as integers incremented from a predetermined integer, said status setting unit being configured to classify, on the basis of a remainder of dividing the identification number of said central managing device by a divisor which is not less than "2", all of said central managing devices into the plural groups in the number equal to the divisor.

6. A home appliance monitoring system as set forth in claim 1, wherein said status setting unit is configured to measure a period within the communication status of said central managing device is kept in the deactivated status, said status setting unit being configured to, upon acknowledging that the period exceeds a predetermined threshold, determine to set the communication status of said central managing device to the activated status.

7. A home appliance monitoring system as set forth in claim 1, wherein said status setting unit is configured to store, for each central managing device, a history indicative of a time of reception of the monitoring information from said central managing device, said status setting unit being configured to generate, on the basis of the history, a time pattern indicative of transmission time defined as time within which said central managing device sends the monitoring information to said center server and non-transmission time defined as a time at which said central managing device sends no monitoring information to said center server, said status setting unit being configured to calculate a degree of similarity between the time patterns of said central managing devices, said status setting unit being configured to determine, on the basis of a comparison of the degree of the similarity and a predetermined threshold, whether or not the time patterns are similar to each other, said status setting unit being configured to classify said central managing devices having the time patterns similar to each other into the same group, and classify said central managing devices having the time patterns dissimilar to each other into different groups, said status setting unit being configured to, with regard to said central managing devices belonging to the same group, send the activation indication signal such that the communication status of said central managing device is kept in the activated status within the transmission time of the time pattern corresponding to the group, and send the deactivation indication signal such that the communication status of said central managing device is kept in the deactivated status within the non-transmission time of the time pattern corresponding to the group.

8. A home appliance monitoring system as set forth in claim 1, wherein said home system further comprises a plurality of said home appliances having the monitoring information of different classes, said status setting unit being configured to allocate a priority rank to the class of the monitoring information, said status setting unit being configured to calculate a distribution of the priority rank of the monitoring information for each central managing device, on the basis of the monitoring information received from said central managing device, and said status setting unit being configured to increase the probability to a greater extent to said central managing device which exhibits the distribution in which the priority ranks are offset closer to a high side.

9. A home appliance monitoring system as set forth in claim 2, wherein said communication control unit is configured to monitor data volume of the monitoring information stored in said monitoring information buffer, said communication control unit being configured to, upon acknowledging that the data volume reaches predetermined volume, switch the communication status to the activated status.

* * * * *